(12) United States Patent
Bhakta et al.

(10) Patent No.: US 7,733,261 B2
(45) Date of Patent: Jun. 8, 2010

(54) HYBRID ANALOG TO DIGITAL CONVERTER CIRCUIT AND METHOD

(75) Inventors: Bhavesh Bhakta, Richardson, TX (US); Vahid Yousefzadeh, Boulder, CO (US)

(73) Assignee: Texas Instruments Incorporated, Dallas, TX (US)

( * ) Notice: Subject to any disclaimer, the term of this patent is extended or adjusted under 35 U.S.C. 154(b) by 1 day.

(21) Appl. No.: 12/211,526

(22) Filed: Sep. 16, 2008

(65) Prior Publication Data

US 2010/0066574 A1 Mar. 18, 2010

(51) Int. Cl.
*H03M 1/12* (2006.01)
(52) U.S. Cl. .................. 341/155; 341/119; 341/120; 341/156
(58) Field of Classification Search .............. 341/155, 341/165, 156, 117–120
See application file for complete search history.

(56) References Cited

U.S. PATENT DOCUMENTS

| | | | | |
|---|---|---|---|---|
| 5,248,973 A | * | 9/1993 | Babu et al. ............... | 341/156 |
| 5,543,795 A | * | 8/1996 | Fernald .................... | 341/163 |
| 6,801,146 B2 | * | 10/2004 | Kernahan et al. ........... | 341/122 |
| 7,365,661 B2 | * | 4/2008 | Thomas .................... | 341/117 |
| 2004/0095266 A1 | * | 5/2004 | Kernahan et al. ........... | 341/165 |
| 2006/0033647 A1 | * | 2/2006 | Leung et al. ............... | 341/50 |
| 2008/0042632 A1 | * | 2/2008 | Chapuis et al. ............. | 323/283 |

* cited by examiner

*Primary Examiner*—Jean B Jeanglaude
(74) *Attorney, Agent, or Firm*—John J. Patti; Wade J. Brady, III; Frederick J. Telecky, Jr.

(57) ABSTRACT

A hybrid analog to digital converter circuit for a feedback input to a digital controller of a power supply includes a high resolution, analog to digital converter circuit in communication with a voltage error signal. The high resolution analog to digital converter circuit is configured to provide a first correction signal to the digital controller when the voltage error signal is within a first error range. The hybrid analog to digital converter circuit also includes at least one flash analog to digital converter circuit in communication with the voltage error signal. The flash analog to digital converter circuit(s) is configured to provide at least a second correction signal to the digital controller when the voltage error signal is within at least a second error range.

21 Claims, 3 Drawing Sheets

HYBRID ANALOG TO DIGITAL CONVERTER CIRCUIT AND METHOD

TECHNICAL FIELD

This invention relates generally to analog to digital converter circuits and more particularly, to analog digital converter circuits for digital controllers.

BACKGROUND

A variety of analog to digital converter circuits are known. Analog to digital converter circuits ("ND circuit" or "ADC") are used to convert analog signals to digital signals. In other words, analog electrical signals that vary continuously are converted by analog to digital converter circuits into digital signals. Digital signals, in contrast to analog signals that vary continuously, vary by stepping from one level to another. Analog to digital converter circuits are applied in a variety of applications, for example, when trying to convert an analog signal into a signal that a digital processor can read and understand. In one example, power supplies can be made to provide power to other electronics in a variety of forms. In one such form, power supplies provide power in the form of direct current ("DC") power. In such a power supply, a power output is generally constant at a particular voltage, for example, 5 volts.

Many such power supplies include feedback loops to help determine whether the output provided by the power supply is the expected output. A typical feedback system includes a sensor to sense the output of the power supply and a circuit to determine whether the output is within a given range as expected to be provided by the power supply. For power supplies with digital controllers, the signals indicating variance from the expected power output need to be changed from analog signals to digital signals such that the digital controllers can understand and react to correct the output of the digital power supply. Various types of analog to digital circuits for doing this conversion from an analog error signal to a digital signal readable by a digital controller are known and have been applied in such power supplies.

One such analog to digital conversion circuit is known as a flash analog to digital converter circuit or "flash ADC". Flash ADCs are generally characterized by having a very fast response time and being relatively simple to construct. Flash ADCs, however, lack sufficient resolution for high quality or highly precise power supplies. For example, in order to obtain a resolution suitable for certain precision power supplies, a flash ADC would have to include hundreds of comparator circuit elements. Such circuit sizes are undesirable because the circuit consumes too much power and space.

Another example analog to digital converter circuit used with a digital controller includes high resolution analog to digital converter circuits such as a delta sigma ADC circuit. Such circuits provide much improved resolution over flash ADC circuits. High resolution circuits, however, operate much too slowly to provide the necessary near-instant feedback necessary for maintaining a constant output power from a digitally controlled power supply.

SUMMARY

Generally speaking, pursuant to these various embodiments, a hybrid analog to digital converter circuit for a feedback input to a digital controller of a power supply includes a high resolution, analog to digital converter circuit in communication with a voltage error signal. The high resolution analog to digital converter circuit is configured to provide a first correction signal to the digital controller when the voltage error signal is within a first error range. The hybrid analog to digital converter circuit also includes at least one flash analog to digital converter circuit in communication with the voltage error signal. The flash analog to digital converter circuit(s) is configured to provide at least a second correction signal to the digital controller when the voltage error signal is within at least a second error range. By one approach, the high resolution analog to digital converter circuit operates when the voltage error signal is near zero, and two separate analog to digital converter circuits operate when the voltage error signal is further from zero. One flash analog to digital converter circuit operates when the error is within a positive error range, and a second flash analog to digital converter circuit operates when the voltage error signal is within a negative error range.

A corresponding method for correcting output error in a power supply includes determining an error signal relating to the difference between an output from a power supply and a target output. A high resolution analog to digital converter circuit is operated to convert the error signal into a correction signal for the digital controller when the error signal is within a first error range near zero error. A fast operating analog to digital converter circuit such as a flash analog to digital converter circuit operates to convert the error signal into a correction signal for the digital controller when the error signal is within the second range at least partially further from zero error than the first range of error.

So configured, the hybrid analog to digital converter circuit includes the speed provided by flash analog to digital converter circuits when the error is relatively large to quickly bring the error down to a smaller level. When the error is not large, however, the hybrid analog to digital converter circuit operates with a fine resolution as provided by a high resolution analog to digital converter circuit to achieve a high level of signal accuracy. In such a configuration, the flash analog to digital converters used in the power supply need not be overly large or have an excess number of components to achieve adequately high resolution.

BRIEF DESCRIPTION OF THE DRAWINGS

The above needs are at least partially met through provision of the hybrid analog digital converter circuit and method described in the following detailed description, particularly when studied in conjunction with the drawings wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE PREFERRED EMBODIMENT(S)

Figure 1:
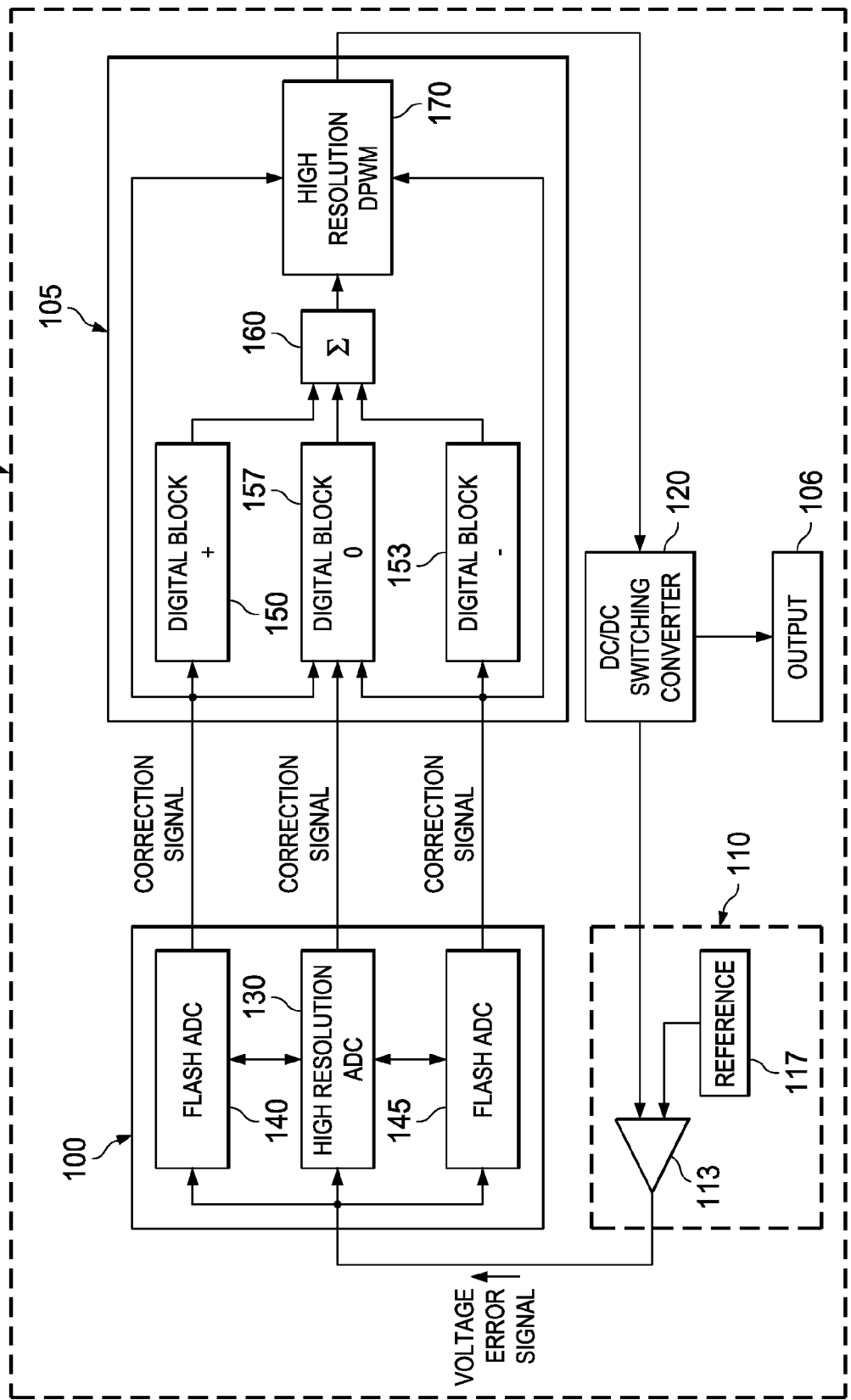
FIG. 1 comprises a block diagram of an example hybrid analog to digital converter circuit in a digitally controlled power supply as configured in accordance with various embodiments of the invention.

These and other benefits may become clear upon making a full review and study of the following detailed description. Referring now to the drawings, and in particular FIG. 1, an example feedback circuit that is compatible with many of these teachings will now be presented. A hybrid analog to digital converter circuit 100 is configured to provide feedback input to a digitally controlled switch mode power supply 102 having a digital controller 105. The switch mode power supply 102 includes a power supply output 106 and a comparing circuit 110 connected and configured to compare a power output from the power supply output 106 to a target output provided by a reference 117. The comparing circuit 110 provides the voltage error signal to the hybrid analog digital converter circuit 100. The comparing circuit may include a comparator 113, as are known in the art.

The hybrid analog to digital converter circuit 100 is configured to receive the voltage error signal. The hybrid analog to digital converter circuit includes a high resolution analog to digital converter circuit 130 in communication with the voltage error signal and configured to provide a correction signal to the digital controller 105 when the voltage error signal is within a first error range. At least one flash analog to digital converter circuit 140 is in communication with the voltage error signal and configured to provide at least a second correction signal to the digital controller 105 when the voltage error signal is within at least a second error range. The digital controller 105 is configured to receive the correction signals from the hybrid analog to digital converter circuit 100 and correct the power output from the power supply output 106 as a function of the correction signals. The digital controller 105 is in communication with the DC to DC switching converter 120 that provides the power supply output 106. The DC to DC switching converter 120 provides a parallel output corresponding to the power supply output 106 to the comparing circuit 110 to allow the comparing circuit 110 to create the voltage error signal.

Digital controller circuits such as that shown at digital controller 105 are known in the art and will only be described briefly herein with respect to the reception of correction signals from a hybrid analog to digital converter circuit. In the example of FIG. 1, the digital controller 105 includes a digital block 150 configured to receive a correction signal that corresponds to voltage errors in a positive voltage error range. Similarly, digital block 153 is configured to receive a correction signal corresponding to a negative voltage error range. Digital block zero 157 is configured to receive a correction signal corresponding to a voltage range near zero error. Error signals processed by the digital blocks 153, 150, and 157 are provided to a summing circuit 160 that in turn provides a summed correction signal to a high resolution digital pulse width modulator 170. The high resolution digital pulse width modulator 170 may also be in communication with the correction signal for both positive and negative voltage error ranges to provide additional corrections for larger voltage output errors. The high resolution digital pulse width modulator 170 provides the pulsed output to the DC to DC switching converter, which in turn creates the power supply output 106. Each of the elements of the digital controller 105 is known in the art and need no further discussion herein.

Figure 2:
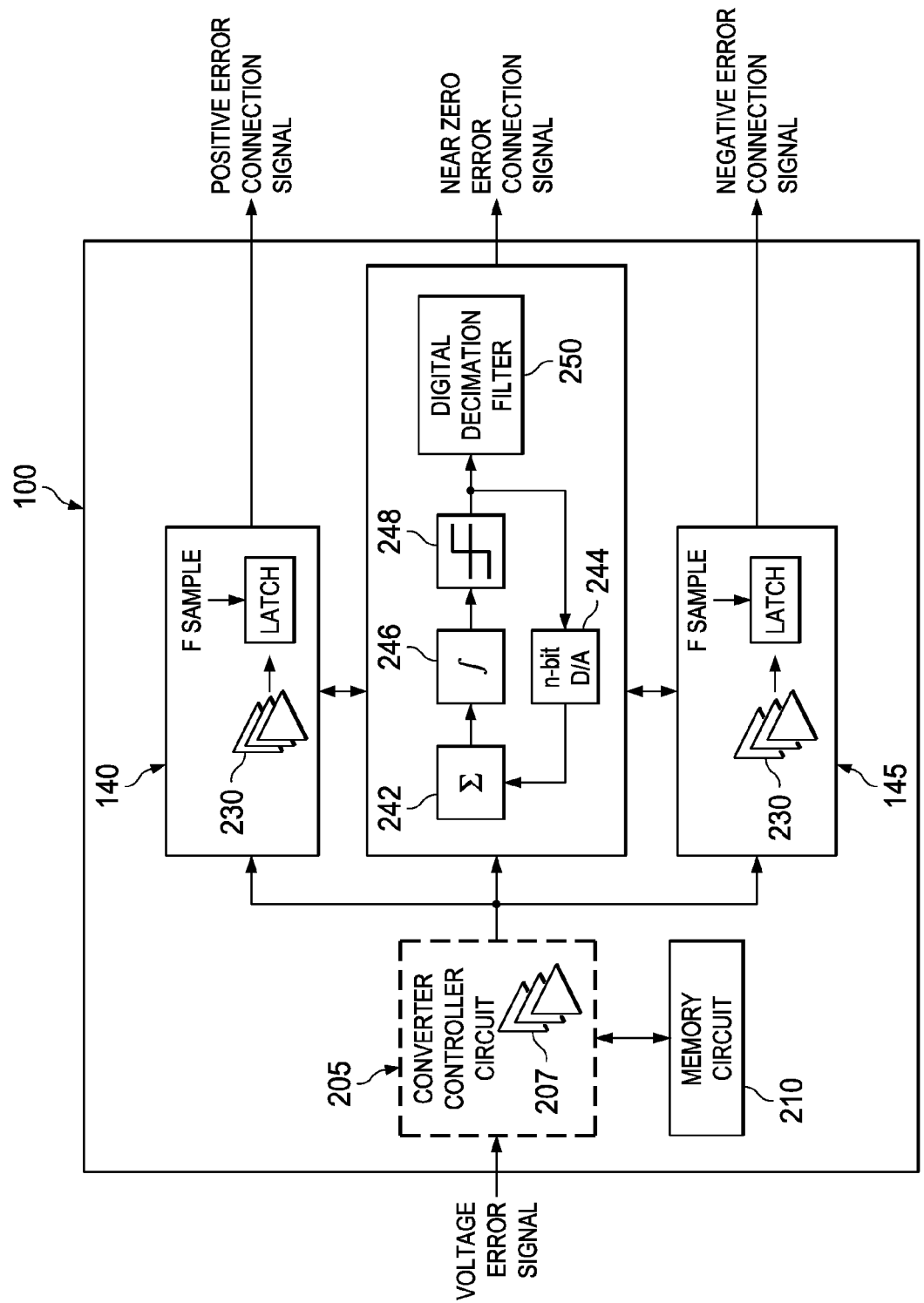
FIG. 2 comprises a block diagram of an example hybrid analog to digital converter circuit as configured in accordance with various embodiments of the invention.

With reference to FIG. 2, the hybrid analog to digital converter circuit 100 will be further described. In this example, the hybrid analog to digital converter circuit 100 includes a first flash analog to digital converter circuit 140 in communication with the voltage error signal and configured to provide the second correction signal to the digital controller when the voltage error signal is within the second error range. The second flash analog to digital converter circuit 145 is in communication with the voltage error signal and configured to provide a third correction signal to the digital controller 105 when the voltage error signal is within a third error range.

The first error range typically comprises a range of values about a zero error value such as about twenty milliVolts (mV) such that the high resolution analog to digital converter circuit creates an error correction signal that is of high resolution near zero error. The second error range and the third error range comprise ranges of values at least partially further from the zero error value than the first error range, for example more than about 20 mV error positive or negative. Accordingly, the first flash analog to digital converter circuit 140 will operate when the voltage error signal indicates a positive error that is within the second error range; similarly, the second flash analog to digital converter circuit 145 will operate when the voltage error signal indicates a negative error within the third error range. In one approach, the flash analog to digital converter circuit 140 and 145 and the high resolution analog to digital converter circuit 130 are configured to be in communication such that the high resolution analog to digital converter circuit 130 will not process the voltage error signal when the voltage error signal is outside of the first error range.

By another approach, the hybrid analog to digital converter circuit 100 may include a converter controller circuit 205 including at least one comparator circuit 207 configured to receive the voltage error signal and configured and connected to the elements of the high resolution analog to digital converter circuit 100 such that the high resolution analog to digital converter circuit 100 will not process the voltage error signal when the voltage error signal is outside of the first error range. By yet another approach, the hybrid analog to digital converter circuit 100 may include a memory circuit 210 storing data regarding the first error range and the second error range. The converter controller circuit 205 in this example is in communication with the memory circuit 210, the at least one flash analog to digital converter circuit 140 and 145, the high resolution analog to digital converter circuit 130, and the voltage error signal such that the converter controller circuit 205 compares the voltage error signal to the data in the memory circuit 210. The converter controller circuit 205 controls the operation of the at least one flash analog to digital converter circuit 140 and 145 and the high resolution analog to digital converter circuit 130 according to a function of the stored data and voltage error signal. So configured, the converter controller circuit 205 will control which circuits operate based on the range of the voltage error signal.

By a different approach, the flash analog to digital converter circuit 140 may comprise one flash analog to digital converter circuit configured to accept a plurality of reference thresholds and to provide positive and negative error signals in response to voltage error signals and the plurality of reference thresholds. So configured, a single flash analog to digital converter circuit 140 may provide the error correction signal in response to the voltage error signal, both when the voltage error signal is in the positive and negative error ranges. For example, the converter controller circuit 205 can route the voltage error signal to the flash analog to digital converter circuit 140 when the error is in both the positive and negative error ranges farther from zero. Then, the sign of the error correction signal is inverted when operating in the negative error range for the voltage error signal.

Those skilled in the art will recognize and appreciate that such a converter controller circuit 205 may comprise a fixed purpose hard wired firmware platform or may comprise a partially or wholly programmable platform. All of these architectural options are well known and understood in the art and require no further description herein.

With reference again to FIG. 2, the flash analog to digital converter circuits 140 and 145 are shown comprising a series of comparison circuits 230, which is the typical construction of known flash analog to digital converter circuits. As known in the art, the comparison circuits are configured in a range to take the incoming analog signal, such as a voltage error signal, and convert it into a digital signal based upon a latch circuit and a sample provided to the flash analog to digital circuit. This process and configuration is known in the art.

The high resolution analog to digital converter circuit as shown in FIG. 2, may comprise a delta sigma converter circuit as is known in the art. A delta sigma converter circuit typically includes a summing circuit 242 that sums the voltage error signal based on an input or impulse provided by the n-bit D/A block 244 that provides a timing for the conversion from the analog signal to the digital signal. The summing circuit 242 passes this information to an integrator circuit 246 that in turn passes the information to a threshold circuit 248 that divides the signal into digital portions. This information is passed through a digital decimation filter 250 that creates the correction signal that is passed along to the digital controller for a power supply. Such delta sigma converter circuits are known in the art and it is contemplated that modified versions of such circuits may be used in this context by those of skill in the art.

Figure 3:
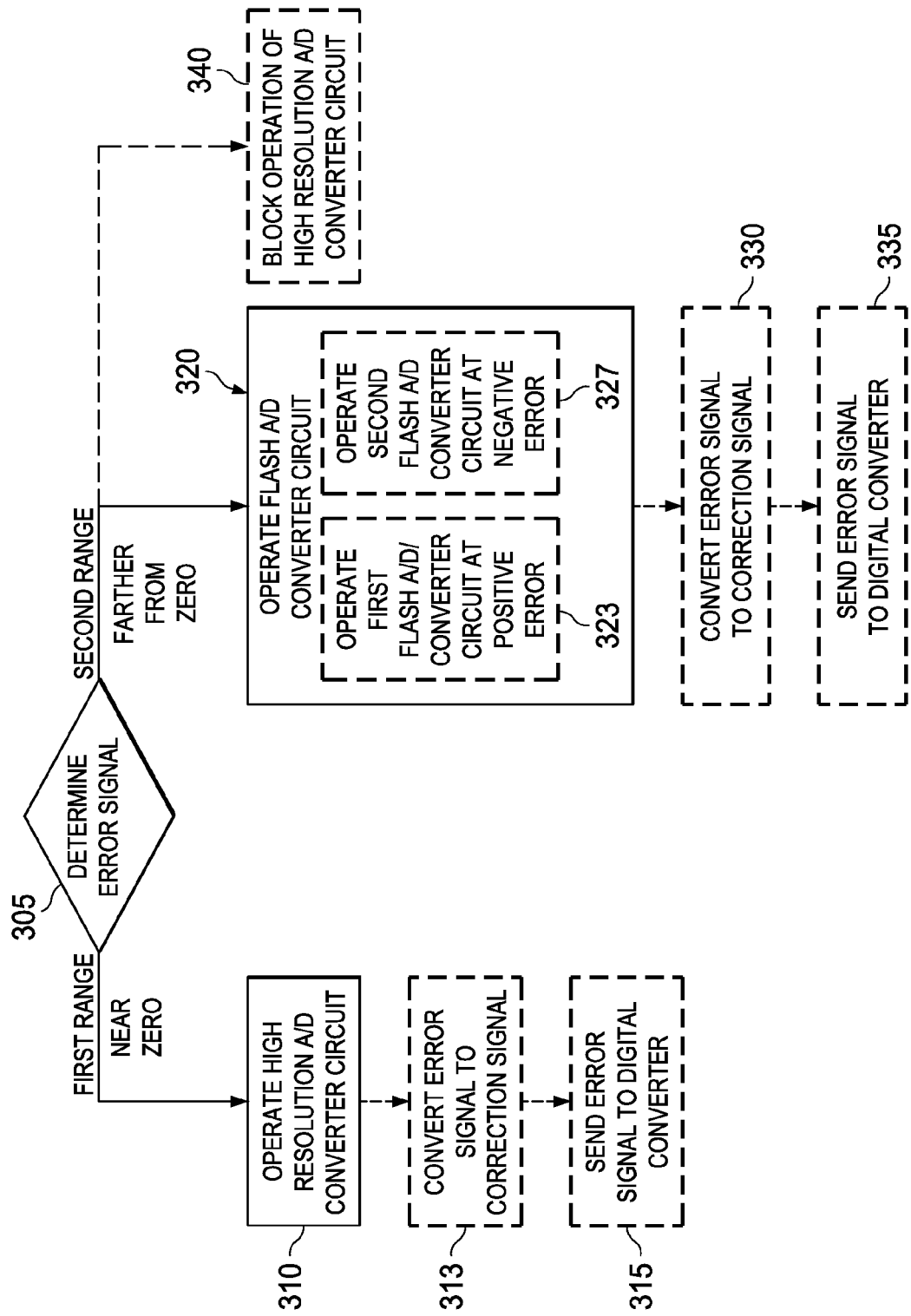
FIG. 3 comprises a flow diagram of a method of operation for a hybrid analog to digital circuit in accordance with various embodiments of the invention.

With reference to FIG. 3, a method for correcting output error in a power supply will be described. At step 305, an error signal is determined relating to the difference between an output from a power supply and a target output. If it is determined that the error signal is within a first range near zero error, then at step 310, a high resolution analog to digital converter circuit is operated to convert the error signal into a correction signal of the digital controller. The high resolution analog to digital converter circuit converts the error signal at step 313 to a correction signal at a fine resolution to provide improved accuracy for the power supply. At step 315, the error signal is sent to the digital converter to control the power supply output.

If the error signal determined at step 305 is within a second range farther from zero, then at step 320 a flash analog to digital converter circuit is operated. For example, at step 323 a first flash analog to digital converter circuit may be operated when the error signal is at a positive error. Similarly, at step 327 a second flash analog to digital converter circuit may be operated when the error signal is in a negative error. At step 330, the error signal is converted to a correction signal at relatively high speed by the flash analog to digital converter circuit to provide a fast response when the error signal is a relatively large distance from zero. At step 335, the error signal is sent to the digital converter to provide the control signal for the correction of the power supply output. In one approach, if the error range is determined at step 305 to be within the second range, then the operation of the high resolution analog to digital converter circuit is blocked at step 340. By blocking the operation of the high resolution analog to digital converter circuit when the error signal is outside of the first range of error, power and computing resources are conserved. In other words, the high resolution analog to digital converter circuit may not be operated when larger errors signals are present that can be quickly processed by the flash analog to digital converter circuits.

So configured, a hybrid analog to digital converter circuit provides the advantages of both the speed of a flash analog to digital converter circuit without needing the large number of components for a flash analog to digital converter circuit while also providing the high resolution as provided by such converter circuits as a delta sigma converter circuit. For large errors, the flash analog to digital converter circuit can quickly bring the error back around to a first range near zero, where the high resolution analog to digital convert circuit can then provide a finely tuned correction signal to the digital controller for a power supply as may be needed for certain applications.

Those skilled in the art may recognize and understand that a wide variety and modifications, alterations and combinations can be made with respect to the above described embodiments without departing from the scope of the invention. For example, the methods for controlling the switching between a high resolution analog to digital converter circuit and flash analog to digital converter circuits may be varied from among firmware converter circuits integrated into the hybrid analog to digital converter circuit or other means. Modifications, alterations and combinations are to be viewed as within the ambient of the inventive concept described herein.

What is claimed is:

1. A hybrid analog to digital converter circuit for a feedback input to a digital controller of a power supply comprising:

a high resolution analog to digital converter circuit in communication with a voltage error signal and configured to provide a first correction signal to the digital controller when the voltage error signal is within a first error range; and at least one flash analog to digital converter circuit in communication with the voltage error signal and configured to provide at least a second correction signal to the digital controller when the voltage error signal is within at least a second error range.

2. The hybrid analog to digital converter circuit of claim 1 wherein the at least one flash analog to digital converter circuit further comprises:

a first flash analog to digital converter circuit in communication with the voltage error signal and configured to provide the second correction signal to the digital controller when the voltage error signal is within the second error range; and a second flash analog to digital converter circuit in communication with the voltage error signal and configured to provide the third correction signal to the digital controller when the voltage error signal is within a third error range.

3. The hybrid analog to digital converter circuit of claim 1, wherein hybrid analog to digital converter circuit further comprises at least one comparator circuit configured to receive the voltage error signal and configured and connected to the high resolution analog to digital converter circuit such that the high resolution analog to digital converter circuit will not process the voltage error signal when the voltage error signal is outside of the first error range.

4. The hybrid analog to digital converter circuit of claim 1, wherein the at least one flash analog to digital converter circuit and the high resolution analog to digital converter circuit are configured to be in communication such that the high resolution analog to digital converter circuit will not process the voltage error signal when the voltage error signal is outside of the first error range.

5. The hybrid analog to digital converter circuit of claim 1, wherein the at least one flash analog to digital converter circuit further comprises one flash analog to digital converter circuit configured to accept a plurality of reference thresholds and to provide positive and negative error signals in response to the voltage error signal and the plurality of reference thresholds.

6. The hybrid analog to digital converter circuit of claim 1, wherein the high resolution analog to digital converter circuit further comprises a delta-sigma converter circuit.

7. The hybrid analog to digital converter circuit of claim 1, wherein the at least one flash analog to digital converter circuit in communication when the voltage error signal is configured to provide a third error signal to the digital controller when the voltage error signal is within a third error range.

8. The hybrid analog to digital converter circuit of claim 7, wherein the first error range comprises a range of values about a zero error value, and the second error range and the third error range comprise ranges of values at least partially further from the zero error value than the first error range.

9. The hybrid analog to digital converter circuit of claim 1, wherein the hybrid analog to digital converter circuit further comprises:
   a memory circuit storing data regarding the first error range and the second error range; and
   a converter controller circuit in communication with the memory circuit, the at least one flash analog to digital converter circuit, the high resolution analog to digital converter circuit, and the voltage error signal such that the converter controller circuit compares the voltage error signal to the data in the memory circuit and controls operation of the at least one flash analog to digital converter circuit and the high resolution analog to digital converter circuit according to a function of the data and voltage error signal.

10. A digitally controlled switch mode power supply comprising:
   a power supply output;
   a digital controller;
   a comparing circuit connected and configured to compare a power output from the power supply output to a target output and provide a voltage error signal; and
   a hybrid analog to digital converter circuit configured to receive the voltage error signal, the hybrid analog to digital converter circuit including:
      a high resolution analog to digital converter circuit in communication with the voltage error signal and configured to provide a correction signal to the digital controller when the voltage error signal is within a first error range; and
      at least one flash analog to digital converter circuit in communication with the voltage error signal and configured to provide at least a second correction signal to the digital controller when the voltage error signal is within at least a second error range, wherein the digital controller is configured to receive correction signals from the hybrid analog to digital converter circuit and correct the power output from the power supply output as a function of the correction signals.

11. The digitally controlled switch mode power supply of claim 10, wherein the high resolution analog to digital converter circuit comprises a delta-sigma converter circuit.

12. The digitally controlled switch mode power supply of claim 10, wherein the at least one flash analog to digital converter circuit comprises:
   a first flash analog to digital converter circuit in communication with the voltage error signal and configured to provide the second correction signal to the digital controller when the voltage error signal is within the second error range; and
   a second flash analog to digital converter circuit in communication with the voltage error signal and configured to provide the third correction signal to the digital controller when the voltage error signal is within a third error range.

13. The digitally controlled switch mode power supply of claim 10, wherein the digitally controlled switch mode power supply further comprises comparator circuits configured to receive the voltage error signal and configured and connected to the high resolution analog to digital converter circuit such that the high resolution analog to digital converter circuit will not process the voltage error signal when the voltage error signal is outside of the first error range.

14. The digitally controlled switch mode power supply of claim 10, wherein the at least one flash analog to digital converter circuit and the high resolution analog to digital converter circuit are configured to be in communication such that the high resolution analog to digital converter circuit will not process the voltage error signal when the voltage error signal is outside of the first error range.

15. The digitally controlled switch mode power supply of claim 10, wherein the hybrid analog to digital converter circuit further comprises:
   a memory circuit storing data regarding the first error range, the second error range, and the third error range; and
   a converter controller circuit in communication with the memory circuit, the hybrid analog to digital converter circuit, and the voltage error signal such that the converter controller circuit compares the voltage error signal to the data in the memory circuit and controls operation of the at least one flash analog to digital converter circuit and the high resolution analog to digital converter circuit according to a function of the data and the voltage error signal.

16. A method for correcting output error in a power supply comprising:
   determining an error signal relating to the difference between an output from a power supply and a target output;
   operating a high resolution analog to digital converter circuit to convert the error signal into a correction signal for the digital controller when the error signal is within a first range of error near zero error; and
   operating a flash analog to digital converter circuit to convert the error signal into a correction signal for the digital controller when the error signal is within a second range of error at least partially further from zero error than the first range of error.

17. The method of claim 16, wherein the method further comprises blocking operation of the high resolution analog to digital converter circuit when the error signal is outside of the first range of error.

18. A feedback circuit comprising:
   a comparing circuit connected and configured to compare a power output from a power supply output to a target output and provide a voltage error signal; and a hybrid analog to digital converter circuit configured to receive the voltage error signal, the hybrid analog to digital converter circuit including:
    a high resolution analog to digital converter circuit comprising a delta-sigma converter circuit in communication with the voltage error signal and configured to provide a correction signal to a digital controller of the power supply when the voltage error signal is within a first error range;
    a first flash analog to digital converter circuit in communication with the voltage error signal and configured to provide a second correction signal to the digital controller when the voltage error signal is within a second error range; and
    a second flash analog to digital converter circuit in communication with the voltage error signal and configured to provide a third correction signal to the digital controller when the voltage error signal is within a third error range, wherein the digital controller is configured to receive correction signals from the hybrid analog to digital converter circuit and correct the power output from the power supply output as a function of the correction signals.

19. The digitally controlled switch mode power supply of claim 18, the feedback circuit further comprises comparator circuits configured to receive the voltage error signal and configured and connected to the high resolution analog to digital converter circuit such that the high resolution analog to digital converter circuit will not process the voltage error signal when the voltage error signal is outside of the first error range.

20. The feedback circuit of claim 18, wherein the at least one flash analog to digital converter circuit and the high resolution analog to digital converter circuit are configured to be in communication such that the high resolution analog to digital converter circuit will not process the voltage error signal when the voltage error signal is outside of the first error range.

21. The feedback circuit of claim 18, wherein the hybrid analog to digital converter circuit further comprises:
    a memory circuit storing data regarding the first error range, the second error range, and the third error range; and
    a converter controller circuit in communication with the memory circuit, the hybrid analog to digital converter circuit, and the voltage error signal such that the converter controller circuit compares the voltage error signal to the data in the memory circuit and controls operation of the first flash analog to digital converter circuit, the second flash analog to digital converter circuit, and the high resolution analog to digital converter circuit according to a function of the data and the voltage error signal.

* * * * *